United States Patent
Kautsch

[11] Patent Number: 5,997,109
[45] Date of Patent: Dec. 7, 1999

[54] UNDERCARRIAGE ASSEMBLY FOR A BELTED WORK MACHINE

[75] Inventor: Dewaine A. Kautsch, De Kalb, Ill.

[73] Assignee: Caterpillar Paving Products Inc., Minneapolis, Minn.

[21] Appl. No.: 08/934,451

[22] Filed: Sep. 19, 1997

[51] Int. Cl.⁶ .................................................. B26D 55/14
[52] U.S. Cl. .......................... 305/129; 305/128; 305/132; 305/134; 305/138; 305/130; 305/136
[58] Field of Search .................................... 305/124, 128, 305/129, 132, 133, 134, 138, 130, 136

[56] References Cited

U.S. PATENT DOCUMENTS

| | | | |
|---|---|---|---|
| 1,725,817 | 8/1929 | Mitchell | 305/132 |
| 2,149,297 | 3/1939 | Knox | 305/132 |
| 2,393,369 | 1/1946 | Hait | 305/138 |
| 2,504,128 | 4/1950 | Jacobson et al. | 305/9 |
| 2,659,596 | 11/1953 | Keysor | 280/124.13 |
| 2,728,611 | 12/1955 | Brauss . | |
| 3,013,808 | 12/1961 | Willetts | 280/684 |
| 3,776,325 | 12/1973 | Jespersen | 180/6.48 |
| 4,230,378 | 10/1980 | Purcell et al. . | |
| 4,339,156 | 7/1982 | Livesay . | |
| 4,373,758 | 2/1983 | Livesay | 305/125 |
| 4,772,151 | 9/1988 | Lammers et al. | 403/162 |
| 4,817,746 | 4/1989 | Purcell et al. | 180/9.1 |
| 4,819,754 | 4/1989 | Purcell et al. | 180/9.1 |
| 4,874,052 | 10/1989 | Purcell et al. | 180/9.1 |
| 4,881,609 | 11/1989 | Purcell et al. | 180/9.5 |
| 5,050,710 | 9/1991 | Bargfrede | 188/71.6 |
| 5,340,205 | 8/1994 | Nagorcka | 305/132 |
| 5,409,075 | 4/1995 | Nieman | 180/9.5 |
| 5,456,331 | 10/1995 | Gustin et al. . | |
| 5,494,125 | 2/1996 | Gustin et al. | 180/9.1 |
| 5,533,587 | 7/1996 | Dow et al. | 305/124 |
| 5,785,395 | 7/1998 | Crabb | 305/138 |

FOREIGN PATENT DOCUMENTS 0597350A  5/1994  European Pat. Off. .

OTHER PUBLICATIONS

Patent Abstract of Japan vol. 096, No. 002, Feb. 29,1996 & JP 07 277234 A Kubota Corp , Oct. 24,1995.

*Primary Examiner*—D. Glenn Dayoan
*Assistant Examiner*—Long Bae Nguyen
*Attorney, Agent, or Firm*—Merchant & Gould

[57] ABSTRACT

The undercarriage assembly includes a roller frame and a pair of wheels held in spaced apart relation by the roller frame. An endless track belt is entrained about the pair of wheels. A bogie arm is pivotally connected to the roller frame at a pivot axis. The bogie arm includes a roller arranged and configured for supporting the track belt between the wheels. The undercarriage assembly also includes an elastomeric bearing positioned about the pivot axis of the bogie arm for reducing shock loads applied to the bogie arm. The elastomeric bearing can be arranged and configured to bias the bogie arm toward the track belt via torsion.

12 Claims, 4 Drawing Sheets

UNDERCARRIAGE ASSEMBLY FOR A BELTED WORK MACHINE

TECHNICAL FIELD

The present invention relates generally to work machines such as tractors. More particularly, the present invention relates to work machines which are propelled by endless elastomeric track belts.

BACKGROUND OF THE INVENTION

Construction, earthmoving, and agricultural type work machines or vehicles are often equipped with endless self-laying track chain assemblies for support and propulsion of the machines. Such prior art track type machines, which utilize metal track chain assemblies, generally operate at low speeds and are relatively noisy. More recently, work machines having endless elastomeric track belts have been utilized to perform work tasks previously accomplished by metal track equipped machines. The machines having elastomeric track belts have many advantages over metal track machines and also over wheel type work machines. Some of these advantages include less weight and maintenance, lower soil compaction, lower noise levels, and the ability to travel on improved roadways.

One type of prior belted work machine is disclosed in U.S. Pat. No. 5,368,115. This patent discloses a work machine having an elastomeric belt entrained about a drive wheel and an idler wheel. Rollers are used to support the elastomeric belt between the drive and idler wheels. The rollers are rigidly connected to a roller frame so as to form a hard bottom for supporting the elastomeric belt. The hard bottom provided by the rollers provides a smooth ride in field conditions. However, at roading speeds on hard surfaces, shock loads applied to the roller frame can be intense. Also, the development of slack in the elastomeric belt can cause the belt to untrack from the drive and idler wheels. What is needed is a belted work machine capable of providing a smooth ride on both soft field surfaces and hard road surfaces. What is also needed is a belted work machine configured to reduce the likelihood of untracking. The present invention addresses these needs, as well as other needs.

DISCLOSURE OF THE INVENTION

One aspect of the present invention relates to an undercarriage assembly for a belted work machine such as a tractor. The undercarriage assembly includes a roller frame, a pair of wheels held in spaced apart relation by the roller frame, and an endless track belt entrained about the pair of wheels. The assembly also includes a bogie arm pivotally connected to the roller frame at a pivot axis. The bogie arm includes at least one roller arranged and configured for supporting the track belt between the wheels. The assembly further includes an elastomeric bearing positioned about the pivot axis of the bogie arm. In certain embodiments, the elastomeric bearing can function to dampen shock loads which are applied to the bogie arm. The elastomeric bearing can also comprise a torsilastic spring arranged and configured to torsionally bias the bogie arm downward toward the track belt to help prevent the track belt from untracking.

Another undercarriage assembly in accordance with the principles of the present invention includes a roller frame, a pair of wheels held in spaced apart relation by the roller frame, and an endless track belt entrained about the pair of wheels. The assembly also includes a leading bogie arm pivotally connected to the roller frame at a leading pivot axis. The leading bogie arm includes a pair of rollers arranged and configured for supporting the track belt between the wheels. The assembly further includes a trailing bogie arm pivotally connected to the roller frame at a trailing pivot axis. The trailing bogie arm includes a single roller arranged and configured for supporting the track belt between the wheels. The single roller is arranged and configured to trail behind the second pivot axis.

The various aspects of the present invention provide a belted work machine that will ride similar to a hard bottom machine in the field, but provide enough roller dampening to reduce peak roller loads thereby prolonging roller life and reducing ride harshness on hard surfaces. Also, the various aspects of the present invention provide a belted work machine configured to reduce the likelihood of belt untracking.

A variety of additional advantages of the invention will be set forth in part in the description which follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

BEST MODE FOR CARRYING OUT THE INVENTION

Reference will now be made in detail to exemplary aspects of the present invention which are illustrated in the accompanying drawings. Wherever possible, the same reference numbers will be used throughout the drawings to refer to the same or like parts.

Figure 1:
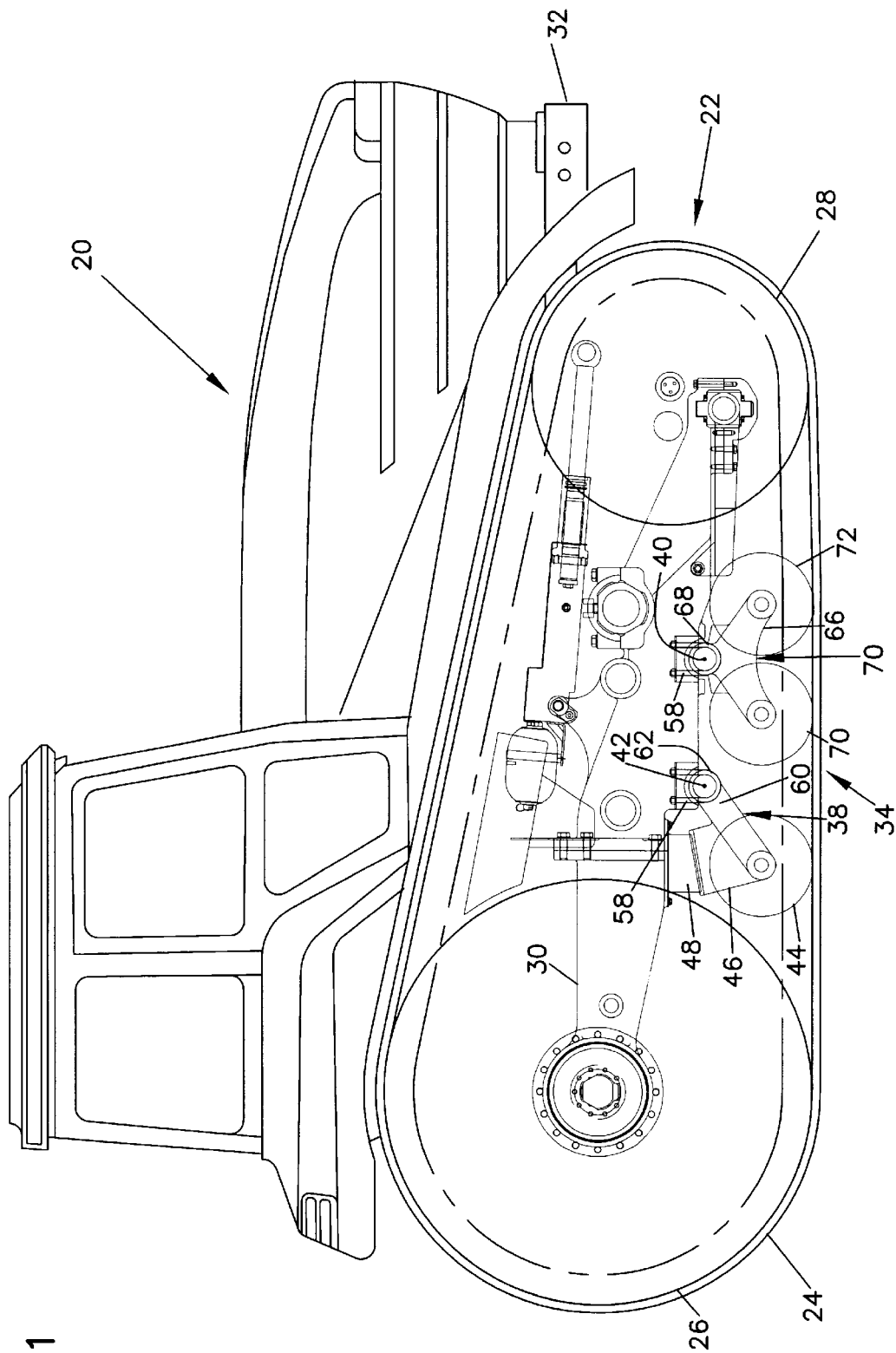
FIG. 1 is a side view of a tractor incorporating an undercarriage assembly constructed in accordance with the principles of the present invention.

FIG. 1 illustrates a work machine 20 having an exemplary undercarriage assembly 22 constructed in accordance with the principles of the present invention. The undercarriage assembly 22 includes an endless track belt 24, preferably made of an elastomeric material such as rubber, entrained about a drive wheel 26 and an idler wheel 28. The drive wheel 26 and the idler wheel 28 are maintained in spaced apart relation by a roller frame 30 which is connected to a main frame 32 of the work machine chassis. A bogie system 34 provides support for the endless track belt 24 in the region between the drive and idler wheels 26 and 28. Although only one endless track belt is shown in the figures, those skilled in the art will recognize that the work machine 20 is equipped with left and right endless track belt assemblies, each having substantially the same configuration illustrated in FIG. 1.

The bogie system 34 includes a leading bogie arm 36 and a trailing bogie arm 38 which are pivotally connected to the roller frame 30. The leading bogie arm 36 is positioned between the trailing bogie arm 38 and the idler wheel 28 so as to lead the trailing bogie arm 38 when the work machine 20 moves in a forward direction. Similarly, the trailing bogie arm 38 is positioned between the leading bogie arm 36 and the drive wheel 26 so as to trail the leading bogie arm 36 when the work machine 20 moves in a forward direction. The leading and trailing bogie arms 36 and 38 are connected to a bottom region of the roller frame 30 and are respectively free to pivot about leading and trailing pivot axes 40 and 42.

The trailing bogie arm 38 includes a single first roller 44 that is rotatably connected to the distal end of the trailing bogie arm 38. A cover member 46 is mounted above the first roller 44. The cover member 46 is arranged and configured to engage an elastomeric pad 48 secured to the bottom of the roller frame 30. The elastomeric pad 48 functions to at least partially dampen shock loads applied to the trailing bogie arm 38.

Figure 2:
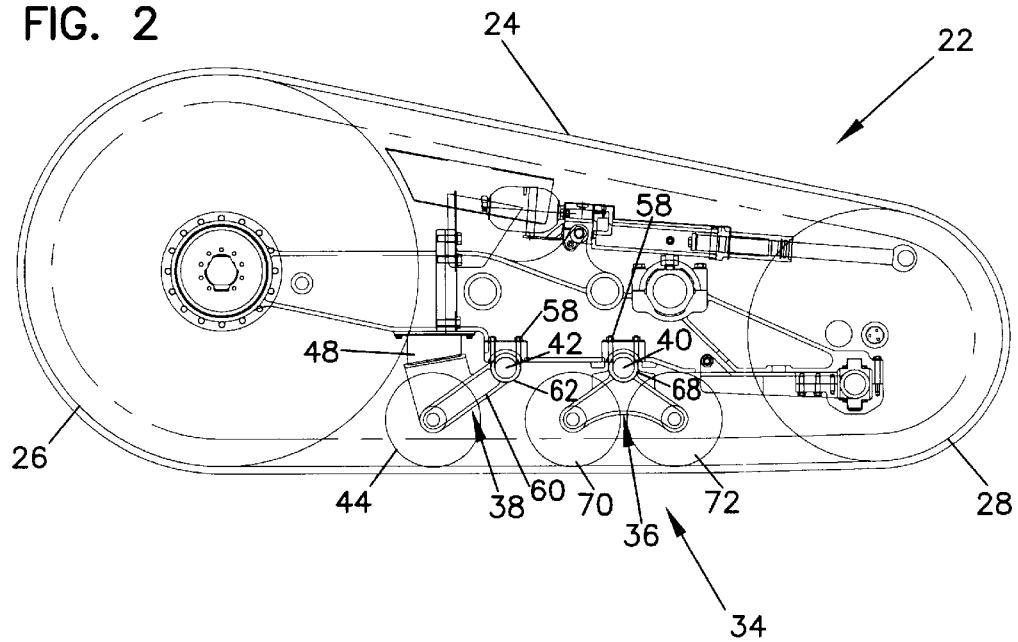
FIG. 2 is an enlarged side view of the undercarriage assembly of FIG. 1, the trailing bogie arm of the undercarriage assembly is shown in an operating position.
Figure 3:
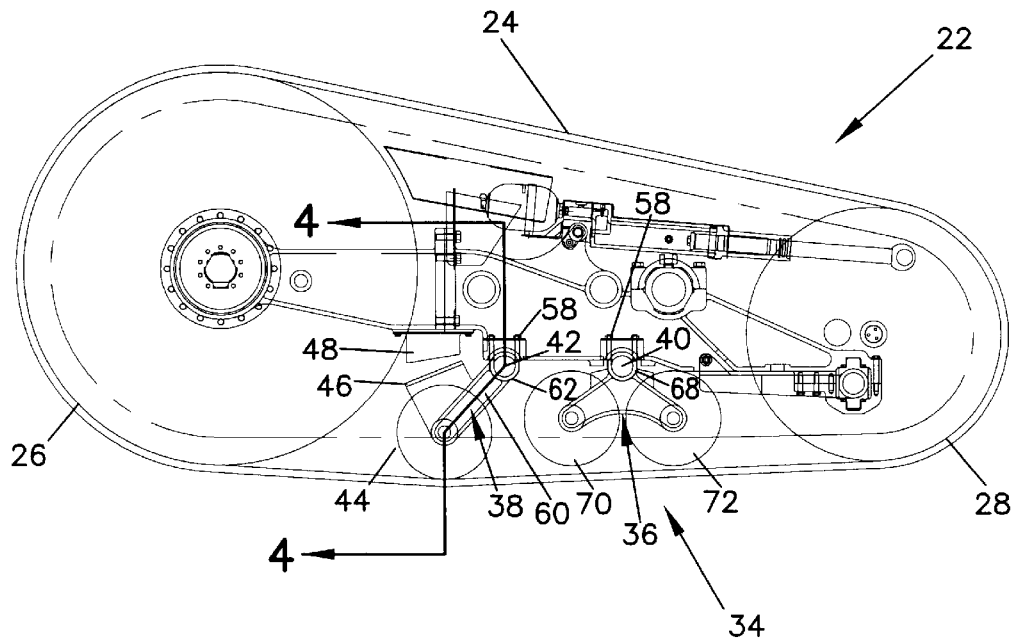
FIG. 3 is another enlarged side view of the undercarriage assembly of FIG. 1, the trailing bogie arm of the undercarriage assembly is shown in a neutral position.

Referring to FIGS. 2 and 3, the trailing bogie arm 38 is pivotally moveable about the trailing pivot axis 42 between an upper operating position (shown in FIG. 2) and a lower neutral position (shown in FIG. 3). The trailing bogie arm 38 is typically positioned in the operating position, with the cover member 46 pressed against the elastomeric pad 48, when the lower portion of the endless track belt 24 experiences normal operating tension. However, when the lower portion of the endless track belt 24 develops slack or a decrease in tension, as shown schematically in FIG. 3, the trailing bogie arm 38 pivots downward from the operating position toward the neutral position such that the first roller 44 follows the track belt 24. In most embodiments of the present invention, the range of pivotal motion between the operating and neutral positions is in the range of 5–15°.

Figure 4:
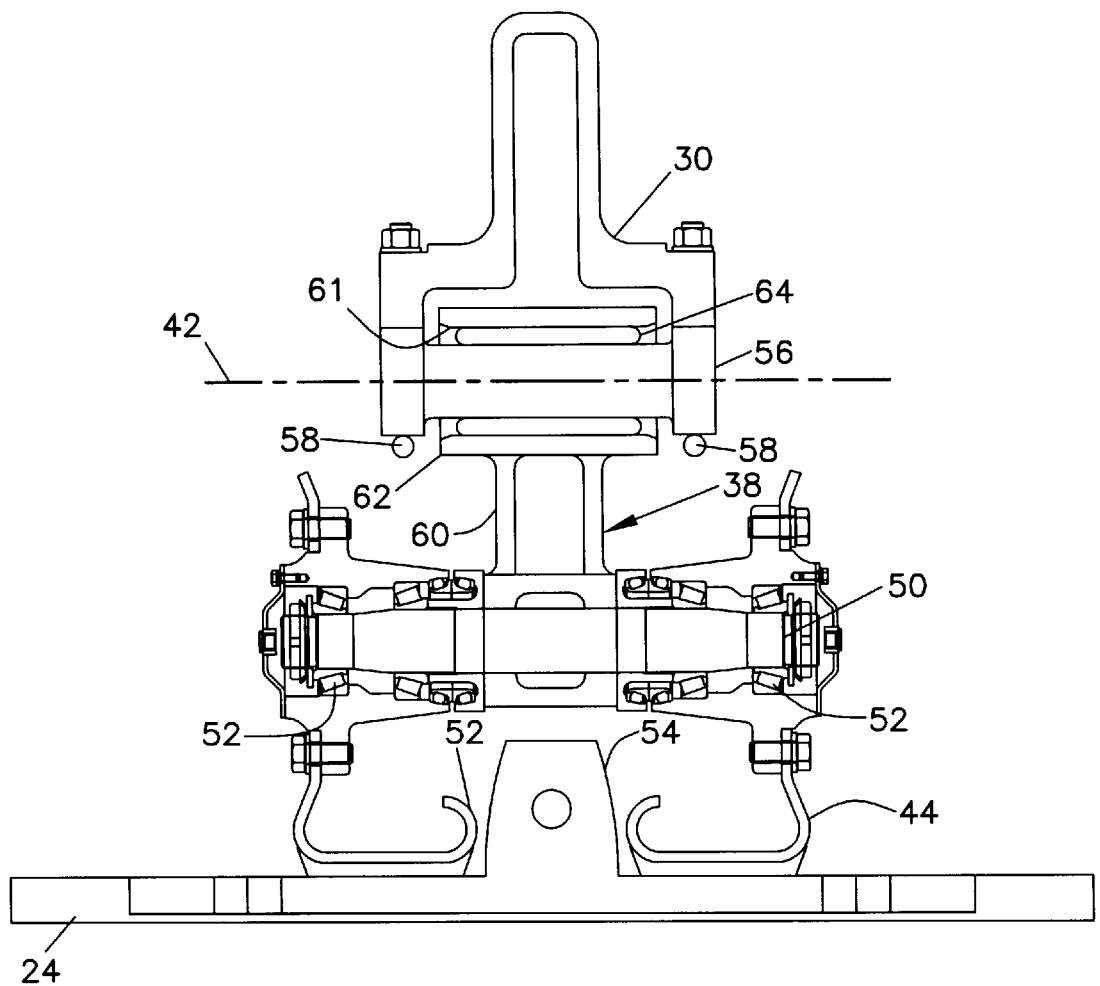
FIG. 4 is a cross-sectional view taken along section line 4—4 of FIG. 3.

Referring to FIG. 4, the single first roller 44 of the trailing bogie arm 38 is rotatably mounted on a shaft 50 via bearings 52. The first roller 44 includes a circumferential slot 53 sized to receive a guide block 54 of the endless track belt 24. For clarity purposes, the upper portion of the first roller 44 has been cut away to reveal a pivot pin configuration, described below, for pivotally connecting the trailing bogie arm 38 to the roller frame 30.

Referring again to FIG. 4, the trailing bogie arm 38 is pivotally mounted on a pivot pin 56 that is fixedly secured to the roller frame 30. As shown in FIG. 4, the pivot pin 56 is fixedly connected to the roller frame 30 by a pair of u-bolts 58 secured at the ends of the pivot pin 56. The trailing bogie arm 38 includes a shaft portion 60 that is integrally formed with a sleeve portion 62. The sleeve portion defines a bore 61 through which the pivot pin 56 extends such that the trailing bogie arm 38 is pivotally connected to the roller frame 30. An elastomeric bearing 64, preferably made of rubber, is positioned within the bore 61 between the sleeve portion 62 and the pivot pin 56. The elastomeric bearing 64 is generally cylindrical and extends around the trailing pivot axis 42. The elastomeric bearing 64 cooperates with the elastomeric pad 48 to reduce or dampen shock loads applied to the trailing bogie arm 38.

The elastomeric bearing 64 is also arranged and configured to bias the trailing bogie arm 38 downward toward the neutral position. Specifically, the elastomeric bearing 64 is a torsilastic spring having an outer surface fixed to the inner surface of the sleeve portion 62 and an inner surface fixed to the outer surface of the pivot pin 56. When the trailing bogie arm 38 is in the neutral position, the elastomeric bearing 64 is substantially free of internal torsional stress. However, as the trailing bogie arm 38 is moved from the neutral position toward the operating position, the outer surface of the elastomeric bearing 64 twists relative to the inner surface of the elastomeric bearing 64 causing torsional stress within the elastomeric bearing 64. The internal torsional stress of the elastomeric bearing 64 causes the trailing bogie arm 38 to be biased toward the neutral position. Consequently, when the trailing bogie arm 38 is in the operating position, the elastomeric bearing 64 biases the trailing bogie arm 38 downward toward the endless track belt 24. As a result, when the endless track belt 24 experiences a slack condition as shown in FIG. 3, the elastomeric bearing 64 causes the trailing bogie arm 38 to follow the track belt 24 downward. By maintaining a close spacial relationship between the first roller 44 and the endless track belt 24, even in slack conditions, the likelihood of the track belt 24 coming untracked is reduced.

To install the elastomeric bearing 64, the inner surface of the elastomeric bearing 64 is fixedly connected to the outer surface of the pivot pin 56 by conventional techniques such as adhesive. Prior to insertion in the bore 61 of the sleeve portion 62, the elastomeric bearing 64 has an outer diameter that is greater than the inner diameter of the sleeve portion 62. To facilitate insertion of the pivot pin 56 and elastomeric bearing 64 into the bore 61, the elastomeric bearing 64 is coated with a lubricant. The pivot pin 56 is then inserted in the sleeve portion 62 of the trailing bogie arm 38 such that the elastomeric bearing 64 is compressed between the sleeve portion 62 and the pivot pin 56. After the elastomeric bearing 64 is positioned within the sleeve portion 62, the lubricant is absorbed within the elastomeric bearing 64 causing an interference or frictional fit to form between the outer surface of the elastomeric bearing 64 and the inner surface of the sleeve portion 62. The friction between the elastomeric bearing 64 and the sleeve portion 62 is great enough to prevent the outer surface of the elastomeric bearing 64 to move relative to the sleeve portion 62. Once the lubricant has been absorbed by the elastomeric bearing 64, the pivot pin is connected to the roller frame 30 by the u-bolts 58. Prior to tightening the u-bolts 58, the pivot pin 56 is pivoted about the trailing pivot axis 42 until the trailing bogie arm 38 is oriented in the neutral position of FIG. 3. Once the trailing bogie arm 38 is in the neutral position, the u-bolts 58 are tightened such that the pivot pin 56 is locked in position.

In certain embodiments of the present invention, it may be desired to use a standard pivot pin connection between the trailing bogie arm 38 and the roller frame 30. In such embodiments, the trailing bogie arm 38 is still configured to follow the elastomeric belt because the center of gravity of the trailing bogie arm 38 is offset from or trails the trailing pivot axis 42. Specifically, the trailing bogie arm 38 is oriented at a higher elevation when in the operating position shown in FIG. 2, as compared to the neutral position shown in FIG. 3. Consequently, when the trailing bogie arm 38 is not supported by the endless track belt 24, the offset center of gravity causes the trailing bogie arm 38 to swing downward from the operating position toward the neutral position.

Referring back to FIGS. 2 and 3, the leading bogie arm 36 of the bogie system has a forked shaft portion 66 that is integrally formed with a sleeve portion 68. Second and third rollers 70 and 72, configured similar to the first roller 44, are rotatably mounted at the ends of the forked shaft portion 66. The sleeve portion 68 allows the leading bogie arm 36 to be pivotally connected to the roller frame 30 in the same manner previously described with respect to the trailing bogie arm 38 shown in FIG. 4. As also previously described with respect to the trailing bogie arm 38, the leading bogie arm 36 can include an elastomeric bearing (not shown) positioned about the leading pivot axis 40. Such an elastomeric bearing would be arranged and configured to dampen shock load supplied to the leading bogie arm 36. Additionally, in one embodiment, the elastomeric bearing could comprise a torsilastic spring configured to bias the leading bogie arm 36 to a central/balanced position which is shown in both FIGS. 2 and 3.

Figure 5:
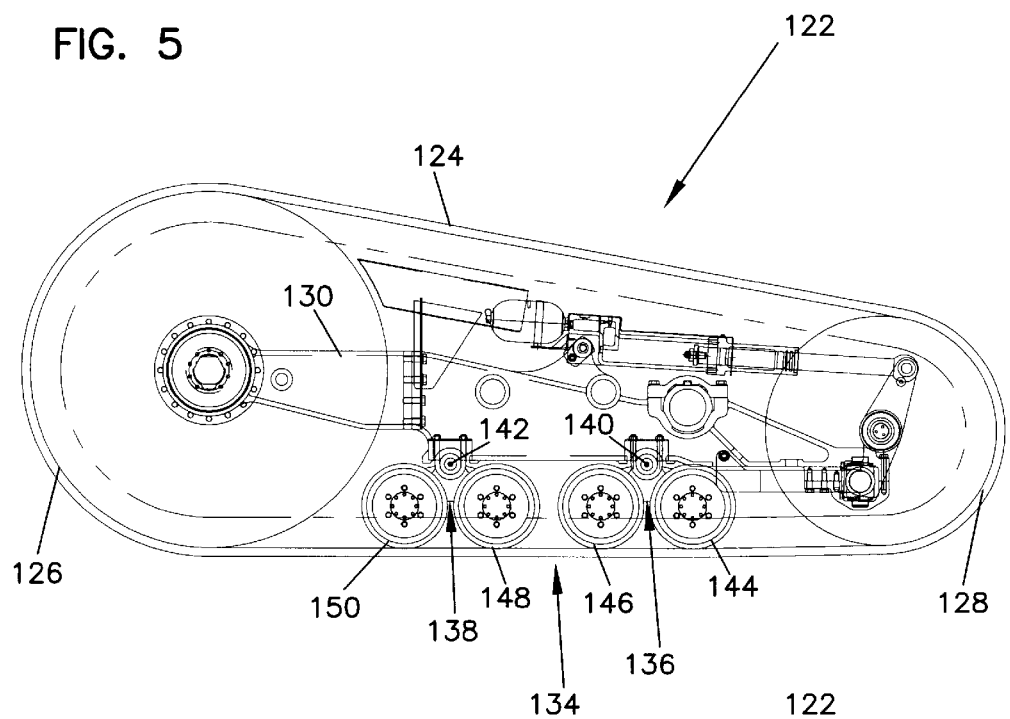
FIG. 5 is a side view of an alternate undercarriage assembly constructed in accordance with the principles of the present invention, a trailing bogie arm is shown in an operating position.
Figure 6:
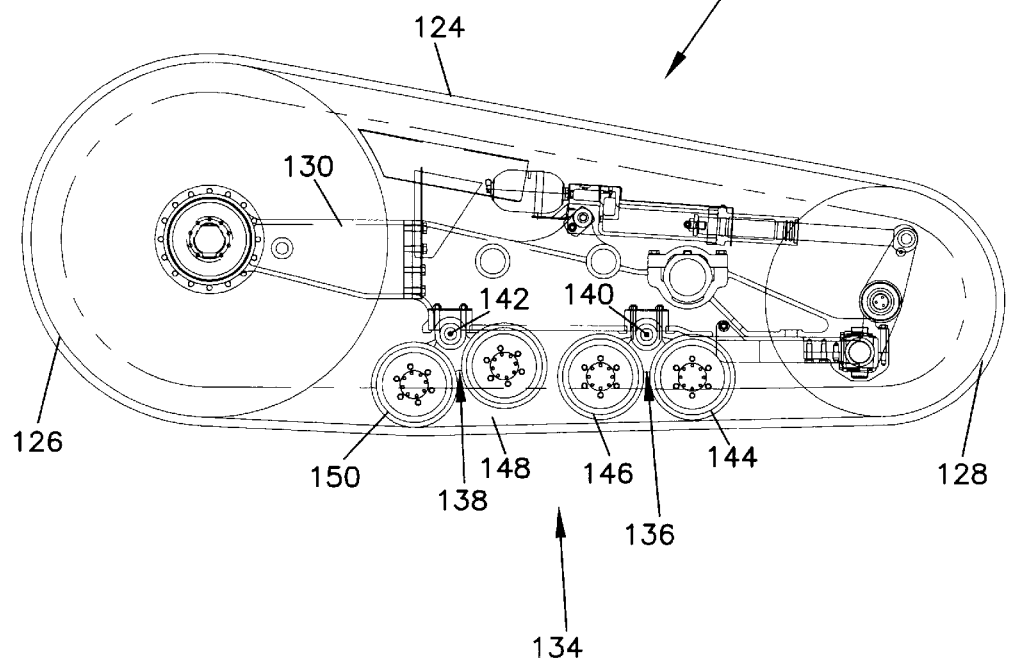
FIG. 6 shows the undercarriage assembly of FIG. 5 with the trailing bogie arm in a neutral position.

FIGS. 5 and 6 show an alternative undercarriage assembly 122 having an endless track belt 124 entrained about a drive wheel 126 and an idler wheel 128. A roller frame 130 maintains spacing between the drive wheel 126 and the idler wheel 128. A bogie system 134 supports the endless track belt 124 between the drive wheel 126 and the idler wheel 128. The bogie system 134 includes a leading bogie arm 136 and a trailing bogie arm 138. The leading and trailing bogie arms 136 and 138 each have forked configurations and are respectively pivotally moveable about a leading pivot axis 140 and a trailing pivot axis 142. The leading bogie arm 136 includes first and second rollers 144 and 146 while the trailing bogie arm 138 includes third and fourth rollers 148 and 150. The rollers 144, 146, 148 and 150 are configured for supporting the endless track belt 124 as it extends below the roller frame 130.

In certain embodiments, the leading and railing bogie arms 136 and 138 can be equipped with elastomeric bearings (not shown) similar to those previously described for reducing shock load applied to the bogie arms. In other embodiments, the leading and trailing bogie arms 136 and 138 can be equipped with torsilastic springs as previously described for biasing the bogie arms toward a desired orientation. FIG. 5 shows the trailing pivot arm 142 in an operating position in which the third and fourth rollers 148 and 150 each support the endless track belt 124. FIG. 6 shows the trailing bogie axis 138 pivoted toward a neutral position in which only the third roller 148 engages the endless track belt 124. By using a torsilastic bearing to bias the third roller 148 toward the neutral position, the third roller 148 stays in close proximity to the belt 124 to help prevent the belt from untracking.

With regard to the foregoing description, it is to be understood that changes may be made in detail, especially in matters of the construction materials employed and the shape, size and arrangement of the parts without departing from the scope of the present invention. It is intended that the specification and depicted embodiments be considered exemplary only, with the true scope and spirit of the invention being indicated by the broad meaning of the following claims.

I claim:

1. An undercarriage assembly for a belted work machine comprising:
   a roller frame;
   a pair of wheels held in spaced-apart relation by the roller frame;
   an endless track belt entrained about the pair of wheels;
   a bogie arm having a sleeve defining a bore and being pivotally connected to the roller frame at a pivot axis, said bogie arm including a roller arranged and configured for supporting the track belt between the wheels;
   a pivot pin being secured to said roller frame about the pivot axis and extending through the bore of the bogie arm; and
   an elastomeric bearing being bonded to the pivot pin, and frictionally engaging an interior surface of the sleeve of the bogie arm.

2. The undercarriage assembly of claim 1, wherein the elastomeric bearing is arranged and configured to bias the bogie arm toward the track belt via torsion.

3. The undercarriage assembly of claim 1, wherein the pivot pin is secured to the roller frame by U-bolts.

4. The undercarriage assembly of claim 1, wherein the bogie arm includes two rollers.

5. The undercarriage assembly of claim 1, wherein the bogie arm is pivotally moveable between first and second positions, wherein the roller of the bogie arm is oriented at a higher elevation when the bogie arm is in the first position than when the bogie arm is in the second position.

6. An undercarriage assembly for a belted work machine comprising:
   a roller frame;
   a pair of wheels held in spaced-apart relation by the roller frame;
   an endless track belt entrained about the pair of wheels;
   a leading bogie arm pivotally connected to the roller frame at a leading pivot axis, the leading bogie arm including a pair of rollers arranged and configured for supporting the track belt between the wheels;
   a trailing bogie arm pivotally connected to the roller frame at a trailing pivot axis, the trailing bogie arm including a single roller arranged and configured for supporting the track belt between the wheels, the single roller being arranged and configured to trail the trailing pivot axis; and
   a first elastomeric bearing positioned about the trailing pivot axis, said first elastomeric bearing providing a torsilastic spring configured to bias the bogie arm toward the track belt to prevent untracking of the track belt.

7. The undercarriage assembly of claim 6, wherein the pair of wheels include a drive wheel and an idler wheel.

8. The undercarriage assembly of claim 7, wherein the trailing bogie arm is located between the drive wheel and the leading bogie arm.

9. The undercarriage assembly of claim 6, wherein the center of gravity of the trailing bogie arm trails the trailing pivot axis such that the trailing bogie arm will pivot downward when not engaged by the track belt.

10. The undercarriage assembly of claim 6, further comprising an elastomeric pad positioned above the single roller of the trailing bogie arm for dampening shock loads.

11. The undercarriage of claim 6, further comprising a second elastomeric bearing positioned about the leading pivot axis for dampening shock loads.

12. The undercarriage of claim 6, further comprising an elastomeric bearing positioned about the trailing pivot axis and configured for torsionally biasing the trailing bogie arm toward the track belt to prevent untracking of the track belt.

* * * * *